B. STECHBART.
MOTION PICTURE MACHINE.
APPLICATION FILED FEB. 5, 1918.

1,287,502.

Patented Dec. 10, 1918.

Witness:
John Enders

Inventor:
Bruno Stechbart,
by Robert Burns
Atty.

UNITED STATES PATENT OFFICE.

BRUNO STECHBART, OF CHICAGO, ILLINOIS, ASSIGNOR, BY MESNE ASSIGNMENTS, TO AMERICAN PROJECTING COMPANY, OF CHICAGO, ILLINOIS, A CORPORATION OF DELAWARE.

MOTION-PICTURE MACHINE.

1,287,502.  Specification of Letters Patent.  Patented Dec. 10, 1918.

Original application filed May 7, 1917, Serial No. 166,867. Divided and this application filed February 5, 1918. Serial No. 215,450.

*To all whom it may concern:*

Be it known that I, BRUNO STECHBART, a citizen of the United States of America, and a resident of Chicago, in the county of Cook, State of Illinois, have invented certain new and useful Improvements in Motion-Picture Machines, of which the following is a specification.

This invention relates to the type of portable motion picture machines described in detail in my prior application for Letters Patent, Serial No. 166,867, filed May 7, 1917, whereof the present application is a division. And this improvement has for its objects:—

To provide a structural formation and association of the light aperture or duct, film guiding means and intermittent film feeding mechanism, adapted to attain a feeding of the film in either direction past the aforesaid light aperture in a practical and effective manner.

To provide in connection with an intermittent film feeding mechanism and light aperture or duct of a motion picture machine, a simple and efficient hinged gate and accessories adapted to maintain the picture film in proper position during its passage past said gate and in addition prevent any buckling tendency in said film in its passage from the intermittent film feeding sprocket drum to and past the light aperture of the machine in the operation of the machine in a reverse manner to attain a reversed display of the series of the pictures of the film.

In the accompanying drawing.

Like reference numerals indicate like parts in the several views.

Figure 1:
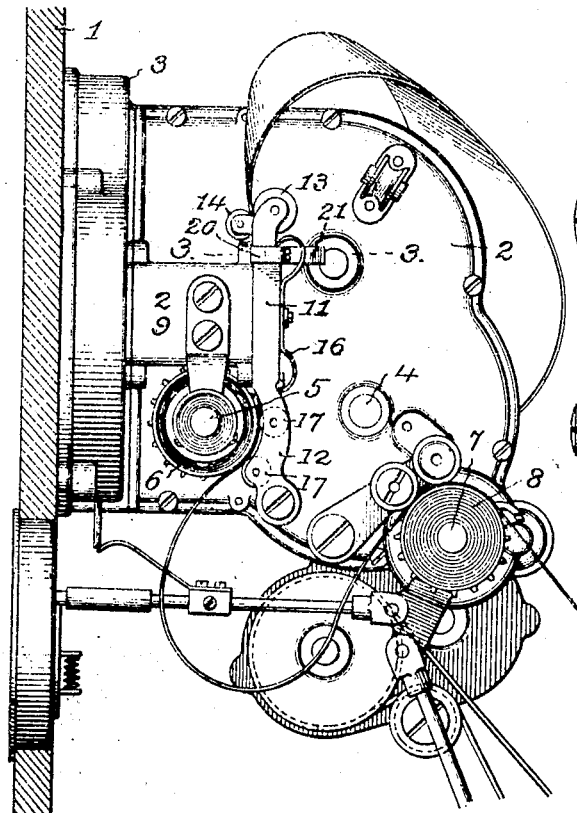
Figure 1, is a side elevation of the film feeding and guiding means of a motion picture machine and of portions of the associated driving mechanism of the film reels, parts being shown in section, and illustrating the general arrangement of the present improvement in connection with said parts.
Figure 2:
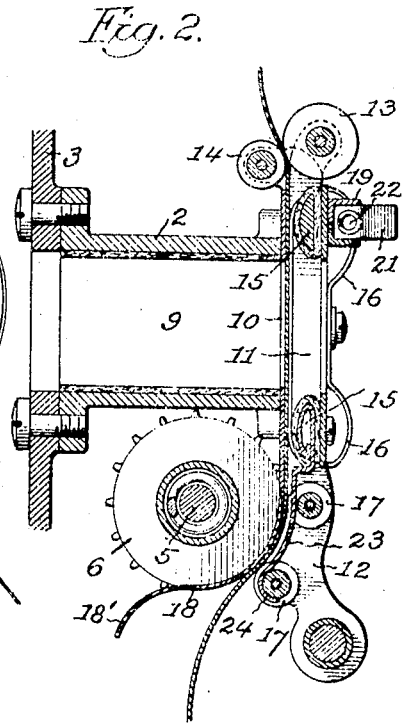
Fig. 2, is a longitudinal section on line 2—2, Fig. 3, of the associated light duct, film guide, film feeding sprocket drums and accessories.
Figure 4:
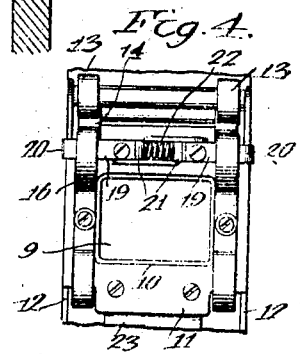
Fig. 4, is a detail elevation of the rear portion of the film gate and accessories.
Figure 3:
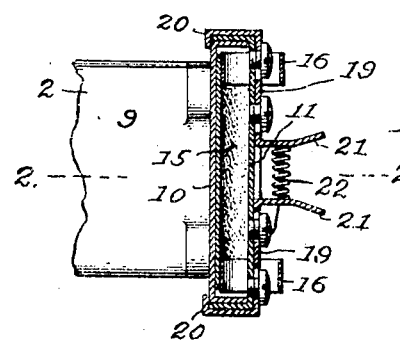
Fig. 3, is a detail horizontal section on line 3—3, Fig. 1, of the film gate latching mechanism.

Referring to the drawings, 1 designates a portion of the inclosing casing for the mechanisms and parts of a motion picture machine.

2 designates the supporting frame or casing for the film feeding and guiding mechanism of the machine, secured to the front wall of the casing 1, and having at its forward end a transversely expanded portion 3 adapted to contain the light shutter of the machine.

4 designates the main operating shaft of the machine, journaled in the aforesaid casing 2 and adapted for engagement with a hand crank for manual actuation.

5 designates a shaft journaled transversely in the casing 2 and having intermittent operation connection with the main shaft 4 by the usual train of gears and an intermittent gearing connection, such as the ordinary Geneva movement, as shown and described in my prior application for Letters Patent, Serial No. 166,865, filed May 1, 1917.

6 designates the intermittent film feeding sprocket drum of the machine, operatively mounted on the shaft 5 aforesaid.

7 designates a clutch carrying shaft journaled in the casing 2 and having operative connection by the usual train of gears with the main shaft 4, and capable of engagement with and disengagement from said train of gears by an automatic clutch connection described in detail in my aforesaid application Serial No. 166,865. The shaft 7 carries at its respective end sprocket drums, one of which is adapted to feed the film in the form of a loop to the film feeding mechanism. The other sprocket drum is adapted to take up the film as it comes from said mechanism and feed said film in a continuous manner to the "take up" reel of the machine.

8 designates the take up sprocket drum above referred to.

9 designates a light duct or aperture formed in the aforesaid casing 2 with its forward end adapted to receive the objective of the machine, while its inner end terminates in a vertical rear wall to which is secured the usual vertical aperture plate 10 upon which the picture film has sliding movement in its passage through the optical axis of the machine.

11 designates the film confining gate, of the usual orificed plate form, associated with the aforesaid aperture plate 10. In the present improvement the gate 11 is pivotally attached to the casing 2 by depending side extensions 12 at its lower end, and has a swinging movement in a vertical plane to and from the aforesaid vertical film guiding aperture plate, 10, to admit of the ready insertion and removal of the picture film.

13 designates a guide roller journaled transversely of the film gate 11 and at the upper end thereof, and having close association with a companion guide roller 14 on the upper part of the casing 2, to provide an upper guiding means for the picture film. In the present structure said guide rollers 13, 14 constitute a part of the means for forming and maintaining the usual initial loop in the picture film, and from which the supply of film to the intermittent film feeding mechanism is supplied with but little frictional impedance.

15 designates upper and lower bearing pads of textile or like elastic material, arranged transversely and adjacent to the respective upper and lower margins of the light aperture of the film guide plate 10, and secured to the film gate 11 by screws or like fastening means.

16 designates vertical spring members secured at their mid-height to the film gate 11, at opposite sides of the light aperture of the gate and of the bearing pads 15. Said spring members have a flat loop form as shown, adapting them to exert an extended yielding stress upon the passing picture film and hold the same against the aperture plate 10 without undue frictional retardance.

17 designates a plurality of bearing rollers journaled in the depending extensions 12 of the film gate, and adapted to hold the picture film in proper operative engagement with the intermittent film feeding sprocket drum 6 aforesaid.

18 designates a curved breast plate, preferably formed as an extension of the aperture plate 10 aforesaid, with its curved portion arranged between the sprocket carrying end disks of the sprocket drum 6 and in line with the perimeters of said end disks. The breast plate 18 is adapted to support the central portion of the passing film, and is formed with a reversely curved lower end 18′ adapted to deflect the film away from the sprocket drum 6 and aid in the formation of the usual loop in the film intermediate of the sprocket drum 6 and the "take up" sprocket drum 8 aforesaid.

19 designates a pair of latch members having a transverse sliding movement on the upper part of the film gate 11 and provided with hook shaped flanges 20 on their outer ends for holding engagement with lugs on the casing 2 aforesaid. The inner ends of said latch members 19 lap past each other and are provided with out-turned prongs or finger pieces 21 for convenient manual operation, and so that when said finger pieces are pressed toward each other by the fingers of the operator, the hook shaped flanges 20 aforesaid will move outwardly and be released from their holding engagement with the lugs of the casing 2, this leaving the film gate 11 free for an opening movement to release the picture film.

22 designates a spring interposed between the finger pieces 21 aforesaid, and adapted to force the same apart, and in turn draw the latch members 19 together.

In the present structure, the intermittent film feeding sprocket drum 6 is arranged immediately beneath the light duct or passage 9 of the casing 2, with the rear part of its toothed periphery in line with the guide face of the aperture plate 10 aforesaid, and in connection with such arrangement the present improvement involves accessories as follows:—

23 designates a curved plate or apron fixedly secured to the lower portion 12 of the film gate and preferably formed with a lower reversely curved end 24 as shown. The plate 23 is arranged between the bearing disks of the rollers 17 aforesaid, and is adapted in connection with the breast plate 18 heretofore described to provide a guide throat for the passing film.

With the above described structural formation and association of parts, the picture film can be fed backward by the intermittent film feeding mechanism, in giving such form of a motion picture exhibition, in that the pushing backward of the film can be practically effected due to the absence of any extended and unsupported portions of that part of the film within and adjacent to the zone of exhibition.

Having thus fully described my said invention, what I claim as new and desire to secure by Letters Patent, is:—

1. In a film feeding mechanism for a motion picture machine, a main frame having a horizontal light housing and passage, an aperture guide plate for the film secured to said frame and having a lower reversely curved portion, an intermittent film feeding sprocket drum arranged between the light housing and the lower portion of the guide plate aforesaid, a film confining gate pivoted at its lower end to the main frame, resilient bearing members secured to the side portions of the gate and having a flat loop form, a guide roller journaled on the upper end of the gate, a companion guide roller journaled on the main frame, and guide rollers journaled on the lower portion of the gate in associated relation to the intermittent film feeding sprocket drum, substantially as set forth.

2. In a film feeding mechanism for a motion picture machine, a main frame having a horizontal light housing and passage, an apertured guide plate for the film secured to said frame and having a lower reversely curved portion, an intermittent film feeding sprocket drum arranged between the light housing and the lower portion of the guide plate aforesaid, a film confining gate pivoted at its lower end to the main frame, resilient bearing members secured to the side portions of the gate and having a flat loop form, a guide roller journaled on the upper end of the gate, a companion guide roller journaled on the main frame, a curved apron and a plurality of guide rollers carried on the lower end of the gate in associated relation to the intermittent film feeding sprocket drum, substantially as set forth.

3. In a film feeding mechanism for a motion picture machine, a main frame having a horizontal light housing and passage, an aperture guide plate for the film secured to said frame and having a lower reversely curved portion, an intermittent film feeding sprocket drum arranged between the light housing and the lower portion of the guide plate aforesaid, a film confining gate pivoted at its lower end to the main frame, resilient bearing members secured to the side portion of the gate and having a flat loop form, upper and lower bearing pads secured to the gate intermediate of the resilient members aforesaid, a guide roller journaled on the upper end of the gate, a companion guide roller journaled on the main frame, and guide rollers journaled on the lower portion of the gate in associated relation to the intermittent film feeding sprocket drum, substantially as set forth.

4. In a film feeding mechanism for a motion picture machine, a main frame having a horizontal light housing and passage, an apertured guide plate for the film secured to said frame and having a lower reversely curved portion, an intermittent film feeding sprocket drum arranged between the light housing and the lower portion of the guide plate aforesaid, a film confining gate pivoted at its lower end to the main frame, and a gate latching means comprising a pair of transverse spring impelled movable members having hook shaped flanges at their outer ends and overlapping extensions at their inner ends provided with operating finger pieces, substantially as set forth.

Signed at Chicago, Illinois, this 1st day of February, 1918.

BRUNO STECHBART.